PHASE SHIFTER HAVING AT LEAST ONE T-SECTION LC CIRCUIT

Filed June 28, 1971 2 Sheets-Sheet 1

INVENTOR,
ROBERT V. GARVER
BY Harry M. Saragovitz
Edward J. Kelly
Herbert Berl
Saul Elbaum
ATTORNEYS

PHASE SHIFTER HAVING AT LEAST ONE T-SECTION LC CIRCUIT

Filed June 28, 1971

INVENTOR,
ROBERT V. GARVER
BY Harry M. Saragovitz
Edward J. Kelly
Herbert Berl
Saul Elbaum
ATTORNEYS United States Patent Office
3,718,873
Patented Feb. 27, 1973

3,718,873
PHASE SHIFTER HAVING AT LEAST ONE T-SECTION LC CIRCUIT

Robert V. Garver, Boyds, Md., assignor to the United States of America as represented by the Secretary of the Army Filed June 28, 1971, Ser. No. 157,518
Int. Cl. H01p 1/18; H03h 7/34
U.S. Cl. 333—31 R 3 Claims

ABSTRACT OF THE DISCLOSURE

The present invention sets forth design criteria and generic LC circuit configurations for two types of phase shifters. The first type accomplishes variable phase shifting by employing a T-section circuit using fixed inductors and variable capacitors in the series leg of the circuit while a parallel connection of fixed inductor and variable capacitor exists in the shunt leg of the circuit. In the second type, digital phase shift is accomplished by sequentially switching between low and high pass T-section filters.

The invention described herein may be manufactured, used, and licensed by and for the United States Government for governmental purposes without the payment to me of any royalty thereon.

FIELD OF THE INVENTION

The present invention relates to phase shifters and more particularly to a generalized design capable of adoption to variable as well as digital phase shifting.

BRIEF DESCRIPTION OF THE PRIOR ART

At the present time there are three primary types of phase shifters. The first conventional type of phase shifter is the switched line; the second type is known as the reflection type; and the third is identified as the loaded line type. This order specifies the chronological development of phase shifters.

Although the reflection type phase shifter offers fairly good bandwidth, this type of shifter presents other problems. Utilization of the switched line type is limited because of the limited length of transmission line used. With the switched line type of phase shifter, time delay changes can be made, but constant phase shift changes cannot be made unless complicated auxiliary circuitry is used such as a Schiffman section.

In recent years, an effort has been made to reduce the size of phase shifters while maintaining sufficient bandwidth. Such efforts are outlined in a published paper entitled Lumped Constant Hard Substrate, High Power Diode Phase Shifters, by Onno and Plitkins of Bell Telephone Laboratories. This paper is dated June 3, 1970. Although the published paper discloses the basic general concept employed for the present invention, the circuitry which evolves from the design criterion therein is unduly complicated by an excessive number of components which adds to the size of a phase shifter.

SUMMARY OF THE INVENTION

The primary advantage to which the present invention is directed is the miniaturization of a phase shifter which can operate at substantial power levels, at microwave frequencies. The simplicity of design which marks the present invention allows economic savings and permits utilization of phase shifters in a great many applications where current size limitations preclude their use.

In essence, the present invention provides a generic design for constructing a variable phase shifter or a digital phase shifter, both using a T-section LC configuration.

BRIEF DESCRIPTION OF THE DRAWINGS

The above-mentioned objects and advantages of the present invention will be more clearly understood when considered in conjunction with the accompanying drawings, in which.

DESCRIPTION OF THE INVENTION

In the switched line phase shifter, switching occurs through a double pole double throw switch which switches from one length of transmission line to a second length. Inasmuch as the primary utilization of this phase shifter is in the microwave region, the switching is usually accomplished with diodes.

Figures 1, 2, 3:
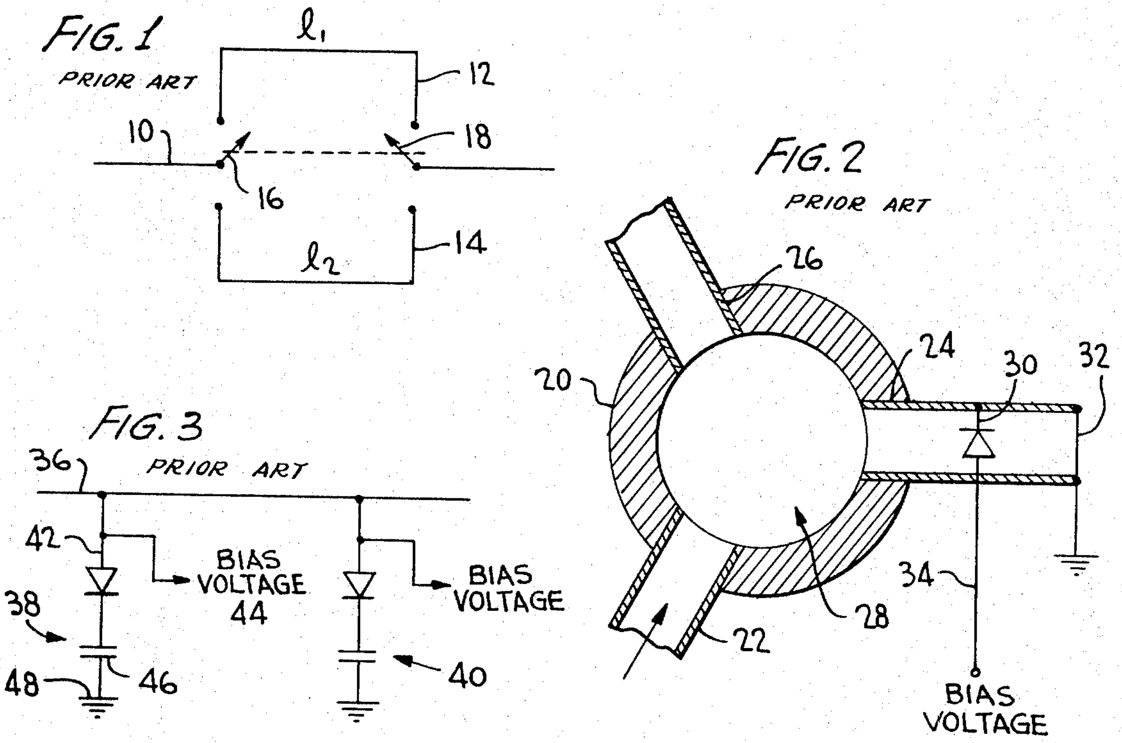
FIG. 1 is a schematic of a conventional switched line phase shifter.
FIG. 2 is a schematic of a conventional reflection type phase shifter.
FIG. 3 is a schematic of a conventional loaded line phase shifter.

To schematically illustrate a physical embodiment of a conventional switched line phase shifter, attention is directed to FIG. 1. A strip conductor 10 is provided with a cutout central section. A switching assembly located at the central section can switch "in" either of two bridging conductors 12 or 14 having different lengths respectively referred to as $l_1$ and $l_2$. Either of the bridging conductors can be switched into contacting relationship with the strip 10 by means of a ganged switch assembly 16, 18. Although shown as mechanical switches, it will be appreciated that switches 16 and 18 are usually diode switches which become conductive upon application of the proper biasing signal as accomplished in a conventional diode switching manner. When rapid switching occurs, a phase shift becomes manifest due to the difference in the lengths of $l_1$ and $l_2$. The phase shift can be expressed as: twice pi multiplied by the ratio of the difference in length divided by the signal wavelength.

Considering FIG. 2, a phase shifter of the reflection type is illustrated. A circulator 20 is provided and generally takes the form of what is known as a "ferrite hockey puck" which is usually located in a strip line assembly. Three input lines are connected to the circulator and angularly displaced by 120 degrees with respect to each other. The input lines are designated 22, 24 and 26. As will be observed by referring to FIG. 2, energy can be fed through input line 22 to a central chamber 28 within the circulator 20. This energy will be circulated to line 24 where the energy undergoes reflection due to one of the following two conditions: A diode 30 is connected in switching fashion across line 24 and when the diode switch is ON, power is reflected from the short circuit 32 which is physically positioned in spaced relationship to the diode switch 30. When the diode switch is OFF, power is reflected from the diode switch itself. Thus, the reflection can come from two different physical locations which will cause a phase delay when the reflected energy reenters the chamber 28 and is directed to the third line 26.

The resultant phase shift when the diode switch is sequentially switched on and off can be mathematically expressed in the same manner as for the switched line, where the difference in length is now twice the space between the diode and the short circuit.

It should be mentioned that the diode 30 has its conduction controlled by a bias voltage applied at 34. This bias voltage is a control signal which may, for example, be applied from a radar computer.

The loaded line phase shifter is typically made by connecting spaced capacitors across a transmission line. At some distance, the capacitors match themselves out so as to produce a reflectionless transmission line. Usually this is accomplished at something less than a quarter wave length. When the capacitors are removed from the transmission line, there is no loading. With the capacitors connected, there is a delay of the transmitted wave which effectuates a phase shift.

The physical embodiment of the loaded line phase shifter is shown in FIG. 3. A transmission line 36 has two parallel paths connected between the line and ground. These paths are indicated by reference numerals 38 and 40. Each identical path includes a diode switch 42 that has its conduction controlled by a bias voltage or control signal applied as 44. Serially connected with each diode is a capacitor 46 that is connected to ground 48. With respect to this type of phase shifter, when the diode switches are both open, the transmission line is matched and it has a certain phase length. When the switches are closed, the line is loaded by capacitors 46 and the electromagnetic wave travelling along the line is delayed. The length is adjusted so that the capacitors match each other out.

The reflection and loaded line phase shifters of FIG. 2 and FIG. 3, respectively, can be made continuously variable by installing varactors in place of the diode switches.

The switch line shifter of FIG. 1 requires one-half wave length line for 180 degree phase shift. The reflection phase shifter requires a circulator or 3 db coupler (quarter wave length) but the diode inherently gives 180 degree phase shift (the difference between an open and short termination). The loaded line shifter required about one-quarter wave length between the diode and is not useful for phase shifts exceeding 90 degrees.

The present invention represents a phase shifter which may be smaller than one-quarter wave length and yet give a phase shift of 180 degrees, or any value.

In order to appreciate the design of the present phase shifter, the following mathematical discussion is believed to be helpful.

Considering the T circuit shown in FIG. 4, an ABCD matrix expression can be formed in accordance with conventional circuit matrix expressions as follows:

$$\begin{vmatrix} A & B \\ C & D \end{vmatrix} = \begin{vmatrix} 1 & jx \\ 0 & 1 \end{vmatrix} \begin{vmatrix} 1 & 0 \\ jB & 1 \end{vmatrix} \begin{vmatrix} 1 & jx \\ 0 & 1 \end{vmatrix} = \begin{vmatrix} 1-BX & j(2x-x^2B) \\ jB & 1-BX \end{vmatrix}$$

The transmission coefficient can be expressed as follows:

$$S_{12} = \frac{2}{A+B+C+D} = \frac{2}{2(1-Bx)+j(B+2x-x^2B)}$$

For a transmission line match, the following condition must be met:

$$|S_{12}|=1$$

$$|S_{12}| = \sqrt{\frac{2}{2(1-Bx)+j(B+2x-x^2B)} \cdot \frac{2}{2(1-Bx)-j(B+2x-x^2B)}}$$

$$= \sqrt{\frac{4}{4(1-Bx)^2+(B+2x-x^2B)^2}}$$

$$1 = \frac{4}{4(1-Bx)^2+(B+2x-x^2B)^2}$$

$4(1-Bx)^2+(B+2x-x^2B)^2=4$, therefore $$B=\frac{2x}{x^2+1}$$

Computing the matrix expression above, the phase delay may be calculated as:

$$\Phi = \tan^{-1}\left|-\frac{B+2x-x^2B}{2(1-Bx)}\right|$$

Substituting the expression for B when a match occurs, the phase delay may be expressed as:

$$\tan^{-1}\left|\frac{2x}{x^2-1}\right| = -2\tan^{-1} x$$

Figure 4:
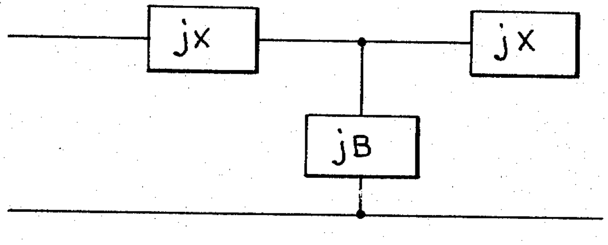
FIG. 4 is a block diagram representation of a generic circuit configuration as used in this invention.
Figure 5:
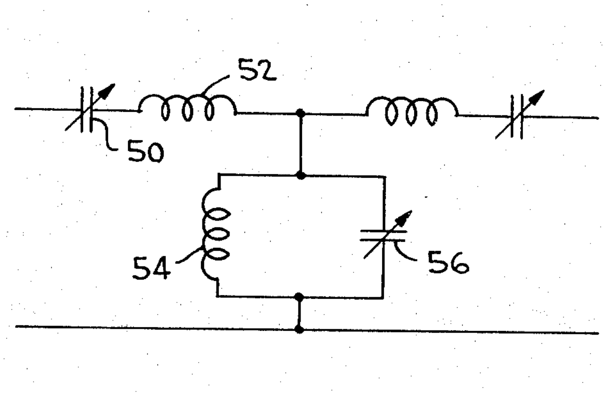
FIG. 5 is a schematic of a variable phase shifter forming part of the present invention.

Considering the above general expression, variable phase shift can be accomplished by a circuit having the general configuration as shown in FIG. 4. Specific LC components for achieving the variable shift are shown in FIG. 5. As will be noted in this figure, each symmetrical arm of the T circuit includes a series connected variable capacitor 50, such as a varactor, and an inductor 52. The central shunt leg of the circuit includes a parallel connected conductor 54 and variable capacitor 56.

For digital phase shift, attention is directed to the general expression for phase delay as it appears above. Note that as $x$ changes sign, so does the phase delay previously expressed as $-2\tan^{-1} x$. Therefore, switching between $+x$ and $-x$ will take the phase from a plus to a minus value so as to generate a phase shift of $4\tan^{-1} x$.

Figure 6A:
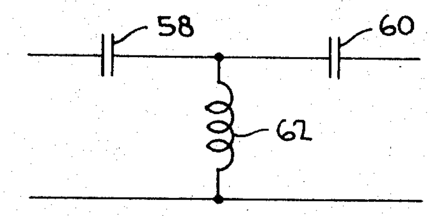
FIG. 6*a* is a high pass filter used for digital phase shifting in the present invention.
Figure 6B:
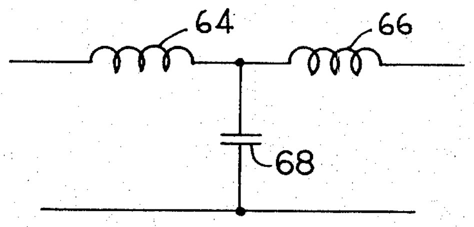
FIG. 6*b* is a low pass filter used for digital phase shifting in the present invention.

In order to achieve digital phase shift, the switching between $+x$ and $-x$ can realistically take the form of alternating between the circuits shown in FIGS. 6*a* and 6*b*. In the LC circuit of FIG. 6*a*, there is shown the combination of LC components which serve as a high pass filter. The circuit of FIG. 6*b* represents a low pass filter. Alternation between the circuits of FIG. 6*a* and FIG. 6*b* will cause a digital phase shift. In FIG. 6*a*, the high pass filter circuit includes series connected capacitors 58 and 60 connected at a nodal point by a shunt inductor 62. The circuit of FIG. 6*b* represents a component inversion, namely, serially connected inductors 64 and 66 connected at a nodal point by a shunt connected capacitor 68. Alternation between circuits can be accomplished either by external switching between the circuits as shown in FIG. 7*a* or by switching inside the circuits as shown in FIG. 7*b*.

Figure 7A:
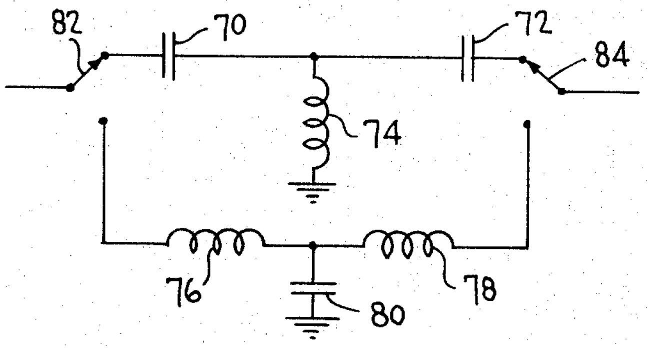
FIG. 7*a* is a schematic showing an external switching assembly for switching between low and high pass filters to obtain digital phase shifting.

Means for switching between the two circuits is illustrated in FIG. 7*a* wherein the series connected capacitors 70, 72 and shunt connected inductor 74 is a circuit similar to that previously discussed in connection with FIG. 6*a*. The series connected inductors 76 and 78 connected in circuit with the shunt capacitor 80 was previously discussed in connection with FIG. 6*b*. Switches 82 and 84, preferably switching diodes, accomplish alternate switching between the circuits.

Figure 7B:
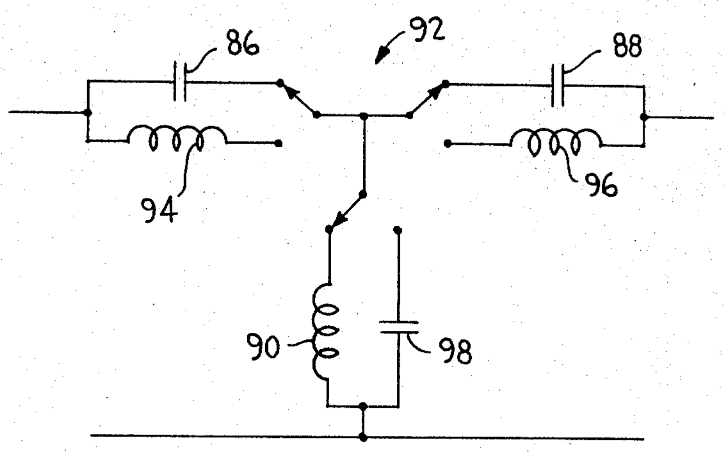
FIG. 7*b* is a schematic showing an internal switching assembly for switching between low and high pass filters to obtain digital phase shifting.

In FIG. 7*b*, switching is accomplish inside the circuits. As illustrated in FIG. 7*b*, the series connected capacitors 86 and 88, along with the shunt connected inductor 90 are connected by a diode switching assembly 92 to form the circuit as previously discussed in connection with FIG. 6*a*. The same diode switching assembly, which may take the form of a conventional switching matrix, is capable of alternating to the connection of series inductors 94 and 96 connected in circuit with the shunt capacitor 98 to form a configuration of the type depicted in FIG. 6*b*.

In the normal connection of the circuits shown in FIGS. 7*a* and 7*b*, the left input port might be connected to a power splitter (not shown) which distributes signal power from a generator to a number of switching circuits, such as those in FIGS. 7*a* and 7*b*. Thus, in a radar application, a plurality of these circuits are tied between a common generator and radiating elements. Depending upon the setting of the various phase shifting circuits, the common signal can be continually phase shifted thereby changing the direction of radiation from the output radiators.

By incorporating the mathematical expressions above, the proper reactance and susceptance for a desired phase delay can be computed. Given these values, the phase shift can be computed from the expression 4 $\tan^{-1} x$. This phase shift, of course, is accomplished by switching between the circuits of FIG. 7*a* or 7*b*.

It should be understood that the invention is not limited to the exact details of construction shown and described herein for obvious modifications will occur to persons skilled in the art.

I claim:

1. A phase shifter having at least one T-section LC circuit connected between a first port and a second port comprising:

two identical reactance means connected in series to form an upper leg of the shifter; and susceptance means connected in shunt between the reactance means for forming the central leg of the shifter, the susceptance of the susceptance means and the reactance of the reactance means related by the equation $$B=\frac{2X}{X^2+1}$$

when matching occurs between the shifter and an output device connectable thereto, where B is susceptance and X is reactance, the transmission coefficient of the shifter ($S_{12}$) equal to 1, and the phase shift of the shifter under match conditions being expressed as $$\phi=-2\tan^{-1} X$$

2. The subject matter set forth in claim 1 wherein the reactance and susceptance means include adjustable components for allowing adjustable phase shift.

3. The subject matter of claim 1 wherein two T-section LC circuits are employed as high pass and low pass filters, and further wherein there is included switching means to selectably connect either the high or low pass filter between input and output terminals of the shifter to achieve selectable digital phase shifting.

References Cited

UNITED STATES PATENTS

| | | | |
|---|---|---|---|
| 2,409,542 | 10/1946 | Carter | 333—31 RX |
| 2,585,842 | 2/1952 | Richardson | 333—75 X |
| 3,374,446 | 3/1968 | Parker | 333—75 X |
| 3,238,528 | 3/1966 | Hines | 333—31 RX |
| 3,562,675 | 2/1971 | Urell | 333—75 X |

OTHER REFERENCES

Onno et al., Lumped Constant, Hard Substrate, High Power Diode Phase Shifters, Bell Telephone Labs, June 3, 1970, p. 2 and Fig. 3 relied on.

PAUL L. GENSLER, Primary Examiner

U.S. Cl. X.R.

333—70 R, 32